United States Patent

Hultzman et al.

[11] Patent Number: 5,885,017
[45] Date of Patent: *Mar. 23, 1999

[54] ADJUSTABLE KEYBOARD ASSEMBLY

[75] Inventors: Scott Donald Hultzman, Putnam, Conn.; Joseph Louis Brigham, Jr., North Attleboro, Mass.

[73] Assignee: Gtech Corporation, West Greenwich, R.I.

[*] Notice: This patent issued on a continued prosecution application filed under 37 CFR 1.53(d), and is subject to the twenty year patent term provisions of 35 U.S.C. 154(a)(2).

[21] Appl. No.: 632,674

[22] Filed: Apr. 16, 1996

[51] Int. Cl.[6] ........................................... B41J 11/56
[52] U.S. Cl. ........................... 400/682; 400/693; 361/680
[58] Field of Search .................................. 400/472, 489, 400/682, 691, 692, 693; 361/680; 235/145 R; 341/22

[56] References Cited

U.S. PATENT DOCUMENTS

| | | | |
|---|---|---|---|
| 4,494,720 | 1/1985 | Gregory et al. | 248/371 |
| 4,989,167 | 1/1991 | Kapec et al. | 364/708 |
| 5,073,050 | 12/1991 | Andrews | 400/82 |
| 5,145,134 | 9/1992 | Hashimoto et al. | 248/183 |
| 5,157,585 | 10/1992 | Myers | 361/380 |
| 5,168,427 | 12/1992 | Clancy et al. | 361/393 |
| 5,228,791 | 7/1993 | Fort | 400/489 |
| 5,262,762 | 11/1993 | Westover et al. | 400/682 |
| 5,267,127 | 11/1993 | Pollitt | 361/680 |
| 5,388,921 | 2/1995 | Chung | 400/472 |
| 5,393,150 | 2/1995 | Fort | 400/489 |
| 5,405,204 | 4/1995 | Ambrose | 400/472 |

FOREIGN PATENT DOCUMENTS

WO 92/13722  8/1992  WIPO .

OTHER PUBLICATIONS

E.H. Frank et al., "Adjustable Keyboard Mechanism", *IBM Technical Disclosure Bulletin*, vol. 25 No. 4, Sep. 1982 (1978–1979).

E.H. Frank et al., "Adjustable Keyboard", *IBM Technical Disclosure Bulletin*, vol. 27 No. 1A, Jun. 1984 (153–154).

*Primary Examiner*—Ren Yan
*Attorney, Agent, or Firm*—Fish & Richardson P.C.

[57] ABSTRACT

A keyboard assembly is pivotally connected a terminal having a recess. The keyboard assembly has a slot and is shaped to lie within the recess. A glide assembly is shaped to fit within the slot and is slidable along the slot. The glide assembly pivotally connects the keyboard to the terminal within the recess. A glide surface, across which the keyboard pivots, is disposed within the recess. The glide surface provides a frictive force between the glide surface and the keyboard. The invention may be applied in general to a lottery terminal.

25 Claims, 3 Drawing Sheets

ADJUSTABLE KEYBOARD ASSEMBLY

BACKGROUND OF THE INVENTION

This invention relates to a pivoting adjustable keyboard assembly for a terminal.

A terminal, such as a lottery terminal, typically is located on a table or counter for use during the course of business. An operator interfaces with the terminal through a keyboard located on an upper surface of the terminal. The accessibility of the keyboard to the operator depends on the height of the counter, the height of the operator, the angle of the operator's view, and the angle at which the operator's hand contacts the keyboard.

SUMMARY OF THE INVENTION

In general, in one aspect, the invention features a pivoting keyboard apparatus for a terminal having a recess. The keyboard is shaped to lie within the recess. A glide assembly pivotally connects the keyboard to the terminal within the recess.

Implementations of the invention may also include one or more of the following features. The recess may have a curved shape or the shape of a section of a cylinder.

The terminal may include a hand rest on the terminal so that an operator's hand may be conveniently positioned to operate the terminal.

The pivoting keyboard apparatus may include at least one glide surface disposed within the recess across which the keyboard pivots, the glide surface providing a frictive force between the glide surface and the keyboard. The glide surface may include polypropylene.

The keyboard may also include at least one guide rib and the recess may have a groove for receiving the guide rib, the guide rib being slidable within the groove to locate the keyboard within the recess.

The glide assembly may include a keyboard glide shaped to snap into a slot in the keyboard, the keyboard glide being slidable along the slot. The glide assembly may further include a flat spring washer to provide a spring action to the glide assembly. The glide assembly may be pivotally connected to the terminal by a screw.

The keyboard may be pivotable by 15 degrees.

In general, in another aspect, the invention features a pivoting keyboard apparatus for a terminal having a recess. The keyboard is shaped to lie within the recess, and having a slot. A keyboard glide pivotally connects the keyboard to the terminal within the recess, the keyboard glide being shaped to snap into the slot and being slidable along the slot. A glide surface is disposed within the recess across which the keyboard pivots, the glide surface providing a frictive force between the glide surface and the keyboard.

In general, in another aspect, the invention features a method of assembling a pivoting keyboard to a terminal having a recess. A keyboard shaped to lie within the recess is provided. The keyboard is pivotally connected to the terminal within the recess by a glide assembly.

The present invention provides a pivoting adjustable keyboard assembly to permit the operator to adjust the angle of the keyboard to maximize the operator's accessibility and comfort in viewing and using the keyboard. The present invention also provides a pivoting adjustable keyboard assembly which may be easily assembled and requires assembly of as few parts as possible.

The pivoting keyboard assembly of the present invention has the advantage of permitting a wide range of sliding motion to allow for a variety of operating positions to accommodate different operators' preferences.

The pivoting keyboard assembly of the present invention has the further advantage of providing a smooth sliding motion for the keyboard.

Other features and advantages of the invention will become apparent from the following detailed description, and from the claims.

DESCRIPTION OF THE PREFERRED EMBODIMENTS

Figure 1:
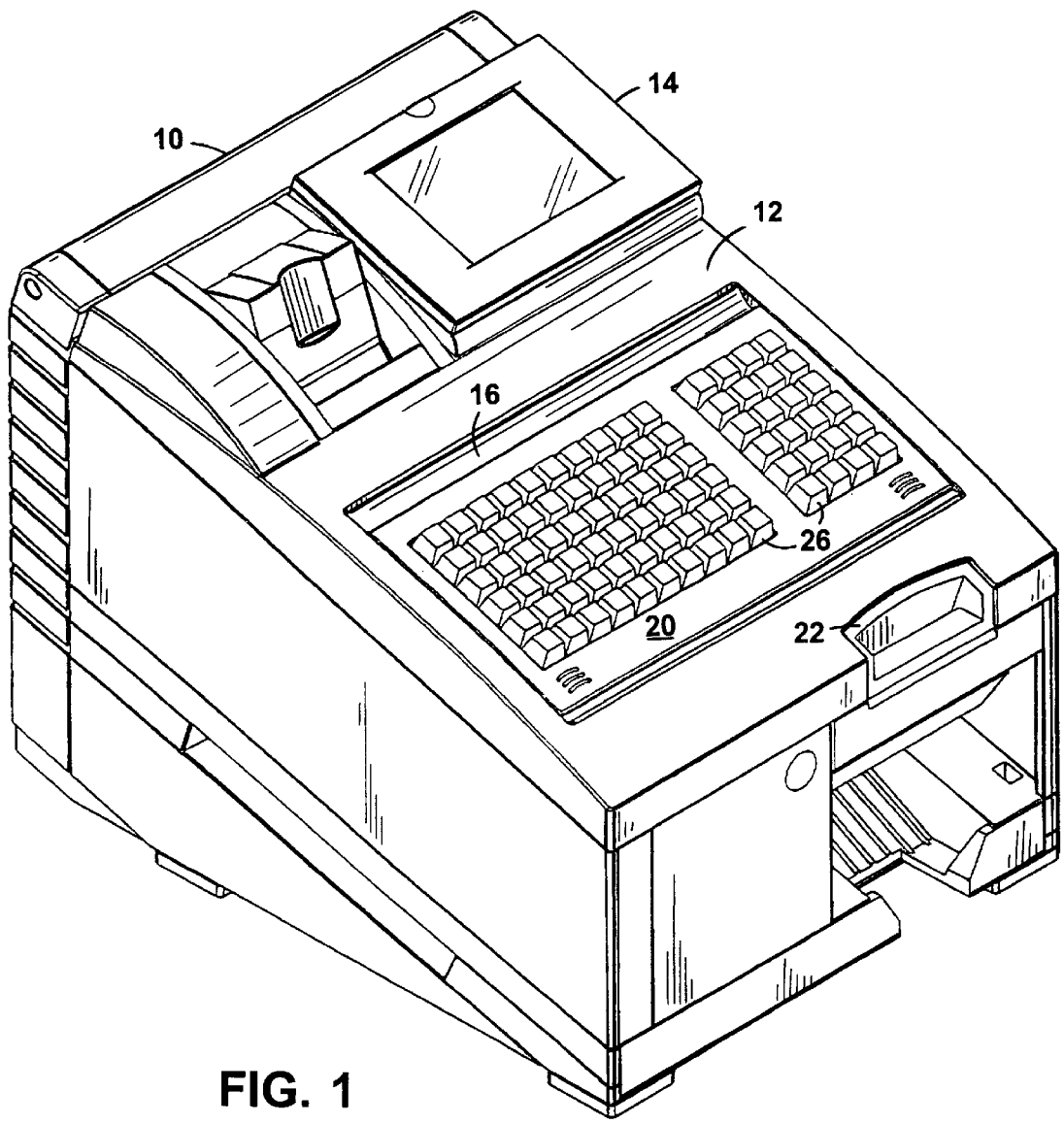
FIG. 1 shows a terminal with a pivotable keyboard.

As shown in FIG. 1, a terminal 10 has a substantially flat upper surface 12 which is generally horizontal. A display 14 is positioned at one end of upper surface 12 farthest from the terminal's operator for viewing by the operator. A curved recess 16 is formed as a depression in surface 12. Recess 16, for example, may form a section of a cylinder with an 8 inch radius. A pivoting keyboard 20 is situated on surface 12 and at least partially rests within recess 16.

The end of surface 12 nearest the operator has a cut-out portion 22 that defines an opening in terminal 10 by which printed receipts or tickets may be inserted into or removed from terminal 10. Cut-out portion 22 may also function as a palm rest for the operator, providing a place on which the operator's hand may be conveniently positioned to operate keyboard 20.

Keyboard 20 contains at least a plurality of switches, i.e. keys 26. In particular, keyboard 20 may consist of both 60-position and 24-position arrays of keys having full-travel switches and/or a membrane keyboard, or any combination of these. In the case of a membrane keyboard, an access slot (not shown) along one edge of keyboard 20 allows the user to change membrane overlays by sliding overlays into and out of access slot 24.

Figure 2:
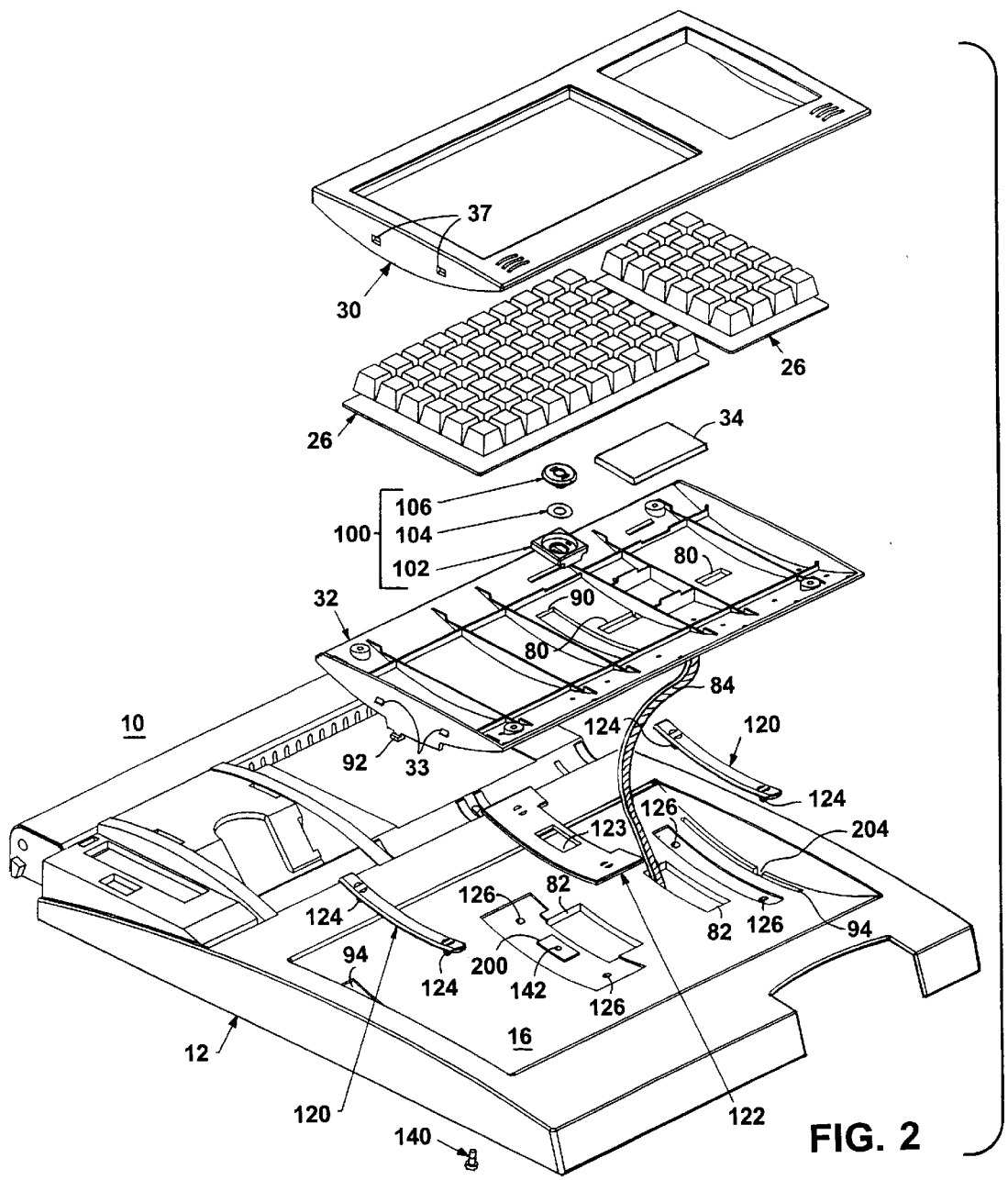
FIG. 2 is an exploded view of the terminal and pivotable keyboard of FIG. 1.

As shown in FIG. 2, keyboard 20 has a top portion 30 and a bottom portion 32, both of which are preferably made from a rigid material such as a hard plastic, PC/ABS in a particular embodiment. Bottom portion 32 has a curved shape to fit within recess 16. Top portion 30 and bottom portion 32 may be connected together by integrally molded protrusions 33 in bottom portion 32 which are snapped into mating apertures 37 in top portion 30, by screws (not shown), or by both of these.

Keys 26 and a keyboard decoder 34 are held between top portion 30 and bottom portion 32. Keyboard decoder 34 contains the circuitry and hardware that converts the operator's physical actuation of keys 26 into electrical signals used to operate terminal 10. In an alternative embodiment, keyboard decoder 34 is located within the chassis of terminal 10.

Keyboard 20 sits within recess 16 and is pivotable back and forth within recess 16. Peripheral glides 120 and center glide 122 provide sliding surfaces on which bottom portion 32 of keyboard 20 may slide. Peripheral glides 120 and center glide 122 are made from polypropylene. The polypropylene surface provides a sufficient frictive force to permit tactile, yet controlled, movement of base 32 along the surface of peripheral glides 120 and center glide 122. Small projections 124 on the underside of glides 120 and 122 are snapped into receiving holes 126 within recess 16 to hold peripheral guides 120 and center guide 122 in place. The connection of keyboard 20 to terminal 10 is made through a rectangular hole 123 in the central portion of center glide 122, which is aligned with a rectangular projection 200 and a hole 142 in upper surface 12 within recess 16.

There are first rectangular openings 80 in bottom portion 32 and second rectangular openings 82 in recess 16. A flexible cable 84 is passed through corresponding first rectangular opening 80 and second rectangular opening 82 to provide electronic communication between keyboard 20 and the electrical circuitry and hardware (not shown) within terminal 10 which are to be operated by keyboard 20. There may be more than one cable 84 passing between first rectangular openings 80 and second rectangular openings 82. Cable 84 also may be connected directly to keyboard decoder 34.

Cable 84 must be long enough to permit sliding bottom portion 32 to be pivotable within recess 16 to the maximum extent desired. When bottom portion 32 is not moved to the maximum extent, there will be a slack portion of cable 84, which may lie within the space between top portion 30 and bottom portion 32, within terminal 10, or a combination of both of these.

Bottom portion 32 has a central slot 90 cut out depthwise along its central portion. Bottom portion 32 also has guide ribs 92. Guide ribs 92 are outwardly-directed projections at the ends of base portion 32 that fit into and are slidable along grooves 94 at the extreme edges of recess 16. Guide ribs 92 are inserted into grooves 94 through apertures 204. Guide ribs 92 locate keyboard 20 from side to side by holding keyboard 20 within grooves 94 of recess 16 and keep keyboard 20 straight when it is pivotally moved back and forth within recess 16. The shape of recess 16 itself helps to locate keyboard 20 from side to side.

Keyboard 20 is connected to terminal 10 via glide assembly 100. Glide assembly 100 fits snugly within slot 90, yet is movable along the length of slot 90. Glide assembly 100 consists of a keyboard glide 102, a flat spring washer 104 and glide nut 106. Keyboard glide 102 has a central recess 202 shaped to receive flat spring washer 104 and glide nut 106. Glide nut 106 also has a central opening which is threaded to receive the threaded portion 146 of a screw 140 (described in further detail below).

Figure 3:
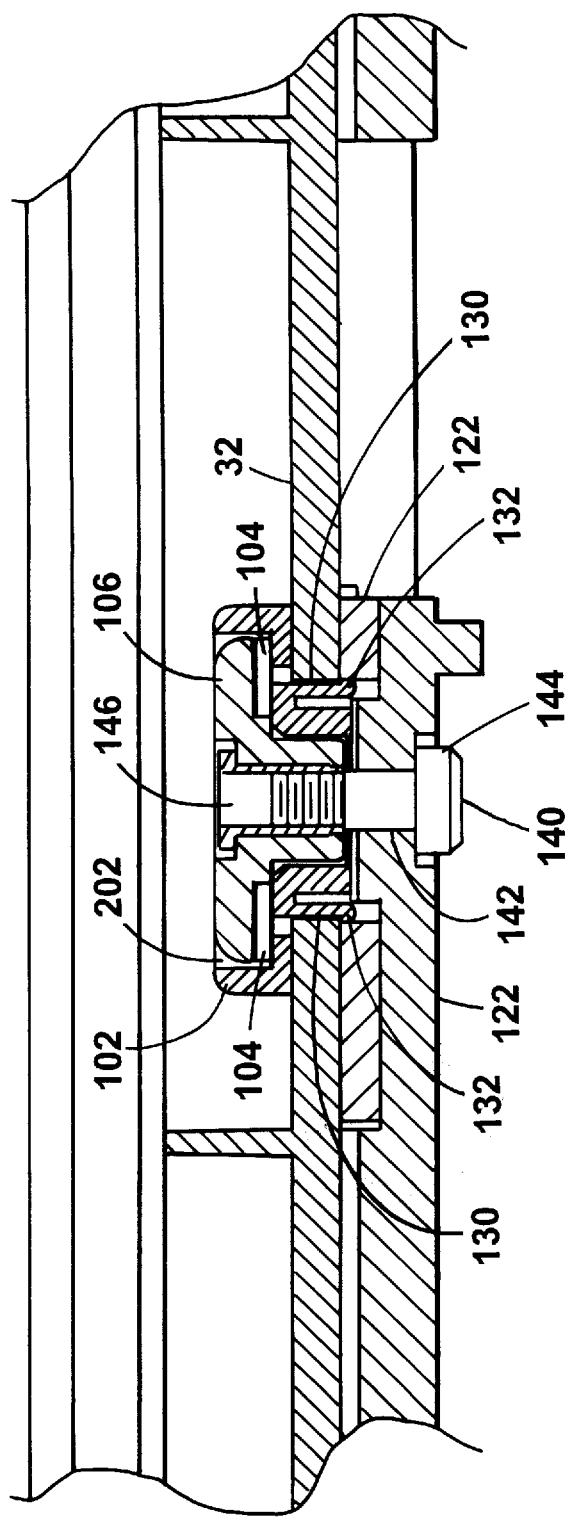
FIG. 3 shows the connection between the terminal and the pivotable keyboard of FIG. 1.

As shown in FIG. 3, keyboard glide 102 has resilient wings 130 which are spaced to fit within slot 90. Wings 130 have hooked end portions 132 that project outwardly slightly beyond wings 130. When keyboard glide 102 is pushed down into slot 90, hooked end portions 132 are deformed inwardly slightly, until they reach the underside of bottom portion 32, at which point hooked end portions 132 snap back into their undeformed state to catch the bottom edge of slot 90 to hold keyboard glide 102 within slot 90. Keyboard glide 102 is then slidable along the length of slot 90.

To assemble the pivoting keyboard, keyboard glide 102 is first snapped into slot 90 within bottom portion 32. Flat spring washer 104 and glide nut 106 are inserted into the central opening of keyboard glide 102. Keys 26 and keyboard decoder 34 are placed into base portion 32. Cable 84 is fed through first opening 80 into second opening 82. Top portion 30 is then connected onto base portion 32. The assembled keyboard 20 is lowered into recess 16, and guide ribs 92 are placed within grooves 94 via apertures 204 at the ends of recess 16. Finally, assembled keyboard 20 is attached by screw 140 to terminal 10 within recess 16.

Referring again to FIG. 3, screw 140 provides the connection between terminal 10 and keyboard 20 through a hole 142 within recess 16. The head 144 of screw 140 has a larger diameter than hole 142 to prevent head 144 from passing through hole 142 so that it is retained within terminal 10. The threaded portion 146 of screw 140 is pushed through hole 142, and then through the central opening in keyboard glide 102 and flat spring washer 104. Threaded portion 146 mates with glide nut 106. Screw 140 is turned to tighten the connection between threaded portion 146 and glide nut 106. Due to the spring action of flat spring washer 104, glide assembly 100 provides a spring force to control the movement of keyboard assembly 20.

Once assembled in this manner, keyboard 20 is slidable within curved recess 16. Keyboard 20 is moved in either direction along the curved surface of recess 16 by applying a force to one of the edges of upper portion 30. Keyboard glide assembly 100 remains in a fixed position with respect to recess 16, and the edges of slot 90 move along wings 130 of keyboard glide assembly 100. Keyboard 20 preferably travels a total of 15 degrees over an 8 inch radius with respect to a plane parallel to upper surface 12 of terminal 10.

The operator can slide keyboard 20 within recess 16 to a desired position, so that the keyboard may be easily viewed by the operator and is accessible to the position of the operator's hand. Due to the frictive forces created by the contact of peripheral glides 120 and center glide 122 and bottom portion 32, and glide assembly 100, keyboard 20 remains in the position set by the operator until it is subsequently moved.

In this arrangement, keyboard 20 functions as a friction-loaded device with an infinite number of degrees of adjustment within the forward and rearward limits of its pivoting movement. The resulting sliding motion of keyboard 20 is tactile and smooth, yet controlled.

Other embodiments are within the scope of the following claims.

What is claimed is:

1. A terminal and keyboard apparatus, the terminal having spaced apart sides and an upper generally horizontal surface having a concave recess in a portion thereof extending laterally between said sides, comprising:
   a keyboard having a top portion with keys and a laterally convex bottom portion shaped to lie within said recess and slide along said upper surface within said recess; and
   a slide assembly for connecting said keyboard to said terminal for sliding movement within said recess and angular adjustment of said keyboard with respect to said generally horizontal surface.

2. The terminal and keyboard apparatus according to claim 1 wherein said recess has the shape of a section of a cylinder.

3. The terminal and keyboard apparatus according to claim 1 further comprising a hand rest on said terminal so that an operator's hand may be conveniently positioned to operate said terminal.

4. The terminal and keyboard apparatus according to claim 1 further comprising at least one glide surface disposed within said recess across which said keyboard slides, said glide surface providing a frictive force between said glide surface and said bottom portion of said keyboard.

5. The terminal and keyboard apparatus according to claim 4 wherein said glide surface comprises polypropylene.

6. The terminal and keyboard apparatus according to claim 1 wherein said keyboard further comprises at least one guide rib and said recess has a groove for receiving said guide rib, said guide rib being slidable within said groove to locate said keyboard within said recess.

7. The terminal and keyboard apparatus according to claim 1 wherein said keyboard has a slot and said glide assembly comprises a keyboard glide shaped to snap into said slot, said keyboard glide being slidable along said slot.

8. The terminal and keyboard apparatus according to claim 7 wherein said glide assembly further comprises a flat spring washer to provide a spring action to said glide assembly.

9. The terminal and keyboard apparatus according to claim 1 wherein said glide assembly is connected to said terminal by a screw.

10. The terminal and keyboard apparatus according to claim 1 wherein said keyboard is pivotable by 15 degrees.

11. A terminal and keyboard apparatus, the terminal having spaced apart sides and an upper generally horizontal surface having a concave recess a portion thereof extending laterally between said sides, comprising:
 a keyboard having a top portion with keys and a laterally convex bottom portion shaped to lie within said recess and slide along said upper surface within said recess, said keyboard having a slot;
 a keyboard glide for connecting said keyboard to said terminal for sliding movement within said recess and angular adjustment of said keyboard with respect to said generally horizontal surface, said keyboard glide being shaped to snap into said slot and being slidable along said slot, and
 a glide surface disposed within said recess across which said keyboard slides, said glide surface providing a frictive force between said glide surface and said bottom portion of said keyboard.

12. A method of assembling a keyboard to a terminal having spaced apart sides and an upper generally horizontal surface having a concave recess in a portion thereof extending laterally between said sides, comprising:
 providing a keyboard having a top portion with keys and a laterally convex bottom portion shaped to lie within said recess and slide along said upper surface within said recess, and
 connecting said keyboard to said terminal for sliding movement within said recess and angular adjustment of said keyboard with respect to said generally horizontal surface by a glide assembly.

13. A method according to claim 12 wherein said recess has the shape of a section of a cylinder.

14. The method according to claim 12 further comprising providing at least one glide surface within said recess across which said keyboard slides, said glide surface providing a frictive force between said glide surface and said bottom portion of said keyboard.

15. The method according to claim 14 wherein said glide surface comprises polypropylene.

16. The method according to claim 12 further comprising locating said keyboard within said recess by inserting at least one guide rib on said keyboard into a groove in said recess, said guide rib being slidable within said groove.

17. The method according to claim 12 wherein said keyboard has a slot and said glide assembly comprises a keyboard glide shaped to snap into said slot, said keyboard glide being slidable along said slot.

18. The method according to claim 17 wherein said glide assembly further comprises a flat spring washer to provide a spring action to said glide assembly.

19. The method according to claim 12 wherein said glide assembly is connected to said terminal by a screw.

20. The method according to claim 12 wherein said keyboard is pivotable by 15 degrees.

21. A keyboard apparatus in combination with a housing having spaced apart sides and an upper generally horizontal surface having a concave recess in a portion thereof extending laterally between said sides, comprising:
 a keyboard having a top portion with keys and a laterally convex bottom portion shaped to lie within said recess and slide along said upper surface within said recess; and
 a glide assembly for connecting said keyboard to said housing for sliding movement within said recess and angular adjustment of said keyboard with respect to said generally horizontal surface.

22. The keyboard apparatus according to claim 21 wherein said bottom portion of said keyboard has the shape of a section of a cylinder.

23. The keyboard apparatus according to claim 21 wherein said keyboard has a slot and said glide assembly comprises a keyboard glide shaped to snap into said slot, said keyboard glide being slidable along said slot.

24. The keyboard apparatus according to claim 23 wherein said glide assembly further comprises a flat spring washer to provide a spring action to said glide assembly.

25. An improved terminal and keyboard apparatus of the type in which the terminal has spaced apart sides and an upper generally horizontal surface, and the keyboard has a top portion with keys, wherein the improvement comprises:
 a glide assembly for connecting said keyboard to said terminal for sliding movement and angular adjustment of said keyboard with respect to said generally horizontal surface, the terminal having a concave recess in a portion of said upper surface extending laterally between said sides, and the keyboard having a laterally convex bottom portion shaped to lie within said recess and slide along said upper surface within said recess.

* * * * *